United States Patent [19]

Berezoutzky

[11] 4,417,829
[45] Nov. 29, 1983

[54] SAFETY DEVICE FOR UNDERGROUND STORAGE OF LIQUEFIED GAS

[75] Inventor: Georges Berezoutzky, Cesson, France

[73] Assignee: Societe Francaise de Stockage Geologique "Goestock", Paris, France

[21] Appl. No.: 349,668

[22] Filed: Feb. 17, 1982

Related U.S. Application Data

[63] Continuation of Ser. No. 106,030, Dec. 21, 1979, abandoned.

[30] Foreign Application Priority Data

Dec. 28, 1978 [FR] France ................................ 78 36633

[51] Int. Cl.³ .............................................. B65G 5/00
[52] U.S. Cl. .......................................... 405/54; 405/59
[58] Field of Search ................. 405/53, 54, 59; 62/45, 62/51, 260; 137/236 R; 220/18

[56] References Cited

U.S. PATENT DOCUMENTS

| 2,952,135 | 9/1960 | Reed | 405/53 X |
| 2,971,344 | 2/1961 | Meade | 405/53 X |
| 2,981,071 | 4/1961 | Brandt | 405/53 |
| 3,056,265 | 10/1962 | Swinney | 405/59 |
| 3,084,515 | 4/1963 | Dougherty | 405/53 |
| 3,089,309 | 5/1963 | Closs et al. | 405/53 |
| 3,105,358 | 10/1963 | Reed | 405/53 |
| 3,490,240 | 1/1970 | Preston | 405/54 |
| 4,117,684 | 10/1978 | Hendrix | 405/54 |

Primary Examiner—David H. Corbin
Attorney, Agent, or Firm—Oblon, Fisher, Spivak, McClelland & Maier

[57] ABSTRACT

A liquefied gas such as propane is stored in underground galleries wherein there is a gaseous phase above a liquid phase and at the bottom, water in a sunk draining trap. The storage is worked, i.e., gas is introduced or extracted through tubes extending into the lower part of the liquefied gas. In case of emergency, failure or damage to the implements, the stored product is isolated. The water level is raised for covering the lower end of the tubes and water is allowed to rise up in the tubes until the pressures are in balance.

14 Claims, 5 Drawing Figures

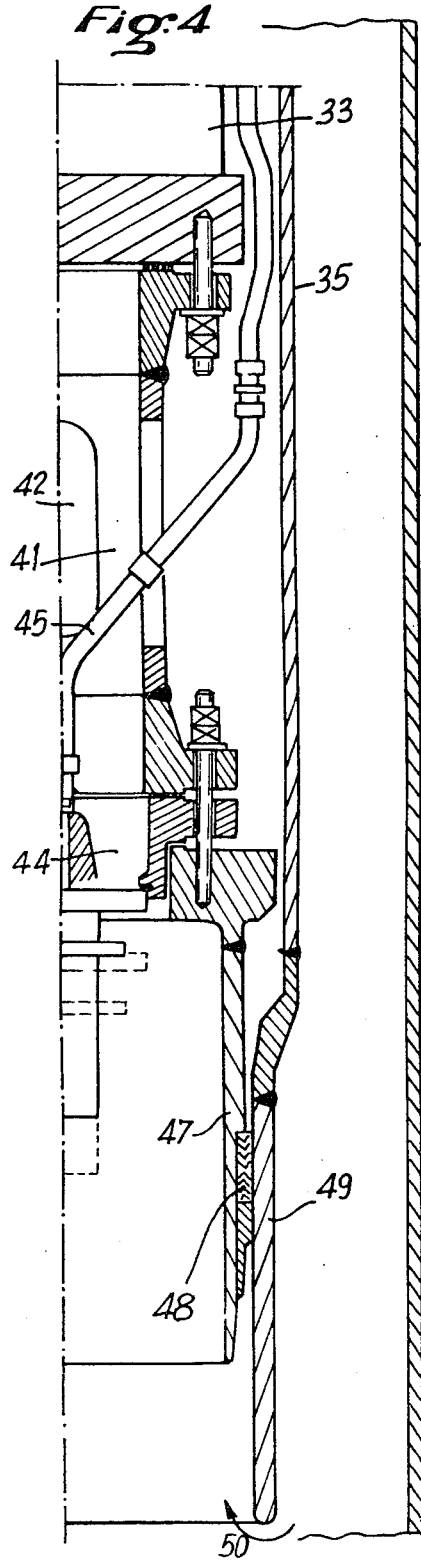
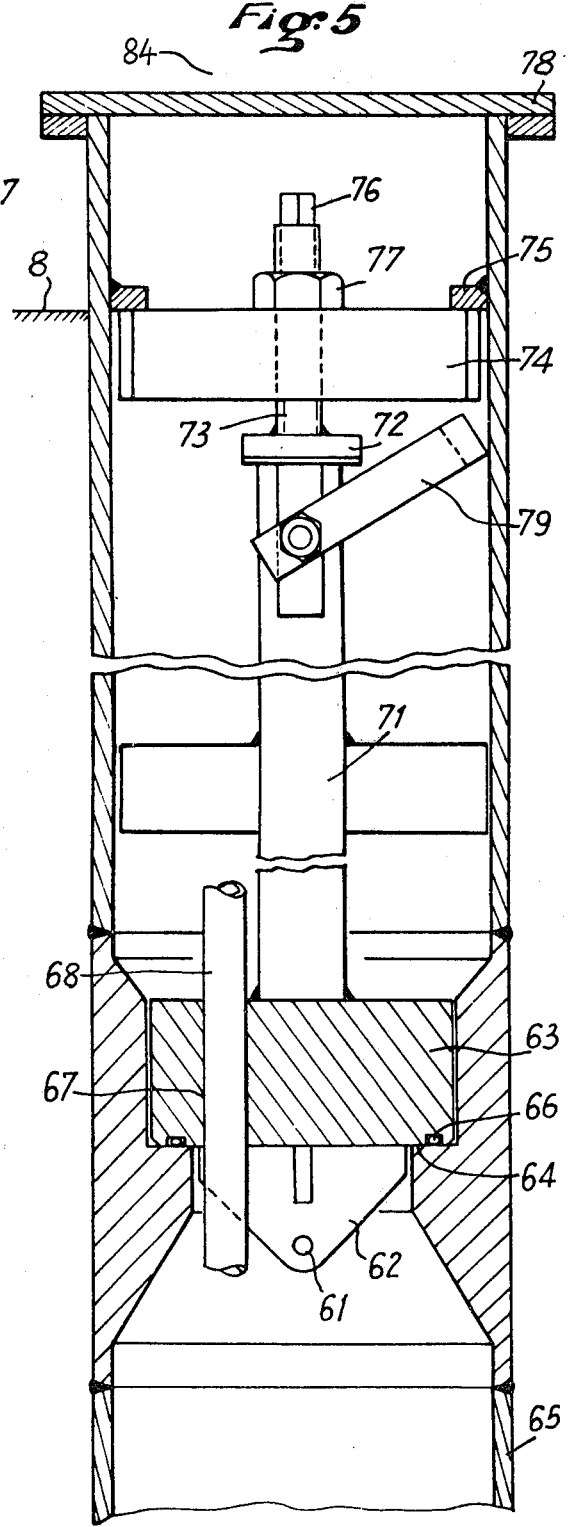

SAFETY DEVICE FOR UNDERGROUND STORAGE OF LIQUEFIED GAS

This is a continuation of application Ser. No. 106,030, filed Dec. 21, 1979, now abandoned.

BACKGROUND OF THE INVENTION

1. Field of the Invention

The invention relates to a safety device for an underground liquefied gas storage cavity or chamber.

2. Description of the Prior Art

FIG. 1 of the appended drawings is a diagrammatic vertical sectional view taken through a conventional storage cavity. The type of gas, the various conditions, the depth levels and dimensions may be different within certain limits. This Example is given only to introduce the problems which are encountered by the operating staff. Further, so as to limit the figure size, without reducing too much the interesting parts thereof it is better not to abide by the proportions.

Generally, the storage shown in FIG. 1 includes a well 1 and a series of galleries or chambers 2 which can be of any form and disposition, such as comb teeth, parallel galleries or chambers and pillars and the like.

Well 1 is covered by a concrete slab 5, at the ground level 93, or at least above the underground water level. The isolation of the storage from the atmosphere is made in the junction well, above the galleries, or near the ground, by a concrete closure 11. The well extends under the floors of the galleries so as to form a water sunk draining trap 12. The well portion which is above closure 11 may be full of water (level 9). The draining trap receives the underground seeping water, and can receive it up to a predetermined level 14. In some other cases, the well may be fitted with a watertight lining or tubing, the upper end of which is closed by a metal cap, welded and pressure resistant. All the tubes of intercommunication run through this cap. The galleries shown in FIG. 1 are used to receive the stored product, especially hydrocarbons. A liquid phase 16 of the product can reach the level indicated at 15 and the gaseous phase 4 fills the higher part of the storage, particularly the upper part of the well, under isolation cover 11.

A plurality of tubes 17, 18, 19 extend from the outside to several levels in the storage, and are connected outside to various implements schematically designated at 20. At the bottom, the seeping water flows permanently through the galleries, runs over the gallery floor and is collected in the draining trap from where it is extracted by an immersed pump (FIG. 3) so as to be held at a suitable level, as it will be discussed thereafter.

Pipe 17 is used for the extraction of the stored product and pipe 18 for the seeping water. The water pump is servo-controlled in such a manner that the water level or water-hydrocarbon interface 14 is kept between the suction openings of pipes 17 and 18. If the water level rises up above tube 17 opening, it is no longer possible to pump hydrocarbon. Should the level lower too much, the water pump would discharge hydrocarbon. Tubes 17 and 18 are each formed by a fixed sheath and contain a discharge pipe which supports a motor and pump unit with the electric or hydraulic control devices used for the operation of motors, pumps, valves or other fittings or accessories.

SUMMARY OF THE INVENTION

The product or hydrocarbon may be propane, at a temperature of 15° C. for example, which corresponds to an absolute pressure of 8.5 bar (7.5 bar relative). The equilibrium or temperature and correspondingly the pressure may vary according to the temperature and the delivery of the introduced propane, the extraction rate and the water seepage. It may be convenient for the clarity of the description to assume that the storage contains propane since it is typical in this application, but it is well understood that the stored product may be any other liquefied product such as a hydrocarbon or the like.

It is necessary to provide the storage with a venting tube or pressure balance tube, the opening of which must be on top, adjacent the upper part of the storage. The implements may further include various tubes and pipes containing probes used for controlling the operation of the bondages and servo devices, and further a pipe for the introduction of hydrocarbon.

In such a storage, it is important to avoid every risk of gas eruption and more especially of liquid eruption, i.e. a massive discharge of hydrocarbon, which can cause fire or explosions of a catastrophic extent.

It is therefore an object of the present invention to provide a mechanism for the safety of a storage of the type above described. According to the invention, in the case where it is not possible to remedy in due time to a failure or damage of any working device or a rupture by accident or instigation of the outside implements, detection mechanisms are provided or the implements are disposed to ensure automatic closing of every communication mechanism between the storage and the outside, by automatically sealing every communication between the storage and the outside, e.g. in response to an alarm signal.

According to an important feature of the invention, the isolation and "putting to sleep" or shutting down of the plant are provided by letting the water rise in the draining trap and flood the pumps. In case of rupture, water would rise in the pumping columns and reach a hydrostatically balanced level with the product inside the storage, the level of which is lower than the stored hydrocarbon level underground. The safety so provided is absolute since the pressure in the storage is balanced by the natural pressure of water in the tubes and the columns. No component is exposed to any pressure bias. In this condition, the storage can be maintained over a long period of time at no risk, without having to furnish energy and without extracting the stored product. For these reasons, this condition is designated as "putting to sleep" of the installation. Nevertheless, it is possible to introduce some product in the cavity.

According to another feature of the invention, all the tubes connecting the underground storage and the outside are fitted with an emergency or safety valve, disposed in the upper part of the tubes, with the exception of water columns, since the opening or destruction of an outside valve has no effect but to allow water to rise in the tube until it reaches a hydrostatic balance level.

According to another feature of the invention, emergency valves are disposed in a safety room, built at the upper part of the well, just under ground level. The room is placed under the concrete slab covering the well. The floor of the room can be made of a grating or the like. In the concrete slab on the ground, there may be provided a hole for working or inspection, with a very heavy closure panel, which can be moved by a big crane or a special similar machine. Warning mechanisms operated by the opening of the panel may be provided.

As indicated in FIG. 3, each suction pump is supported by the discharge tube, the tube and the pump being disposed in a tubular protecting sheath. Because of the reduced height normally available in the safety room, it is not possible to hoist the pumps in the room. Thus the protecting sheath for each extraction pump extends through the safety room, from the floor to the concrete slab and through the concrete slab, so projecting directly outside. Then, the emergency valve of same will be disposed outside and exposed. In view of ensuring safe isolation of the storage in case of an outside accident, according to the invention, the lower end of each suction tube for the stored product is fitted with an emergency valve on the suction side of the pump.

According to the invention, the emergency valves are of the type in which the closing component is disposed in a manner so as to be kept closed under the pressure in the storage, and under the force of a spring biasing the closing component towards the closed position, i.e. upwardly.

Consequently, in case of failure of the operation of the closing component, the valve closes by action of the spring and remains so closed by the biasing action of the spring plus the pressure of the stored product. The storage is so isolated. Such valves are known.

According to another feature of the invention, the venting or pressure balance tube is connected on the one end to a regulation valve controlled in a way to open when the pressure in the storage rises above a predetermined value, for example 7.6 bar relative to propane and on the other end to the suction side of a cooling installation which uses the gas itself as a cooling source and, after cooling and expansion, sends it back to the storge. Due to this heat extraction the temperature lowers and consequently so does the pressure in the storage.

The invention has also for its object various embodiments of gaskets providing the seal for connection tubes between the outside implements and the storage.

BRIEF DESCRIPTION OF THE DRAWINGS

Various other objects, features and attendant advantages of the present invention will be more fully appreciated as the same becomes better understood from the following detailed description of the present invention when considered in connection with the accompanying drawings in which like reference characters designate like or corresponding parts throughout the several views and wherein:

FIG. 4 is an enlarged axial cross sectional partial view showing the suction device for the product.

FIG. 5 is an enlarged axial cross sectional partial view showing an impervious closure for a probe containing tube.

DETAILED DESCRIPTION OF THE PREFERRED EMBODIMENT

Figure 1:
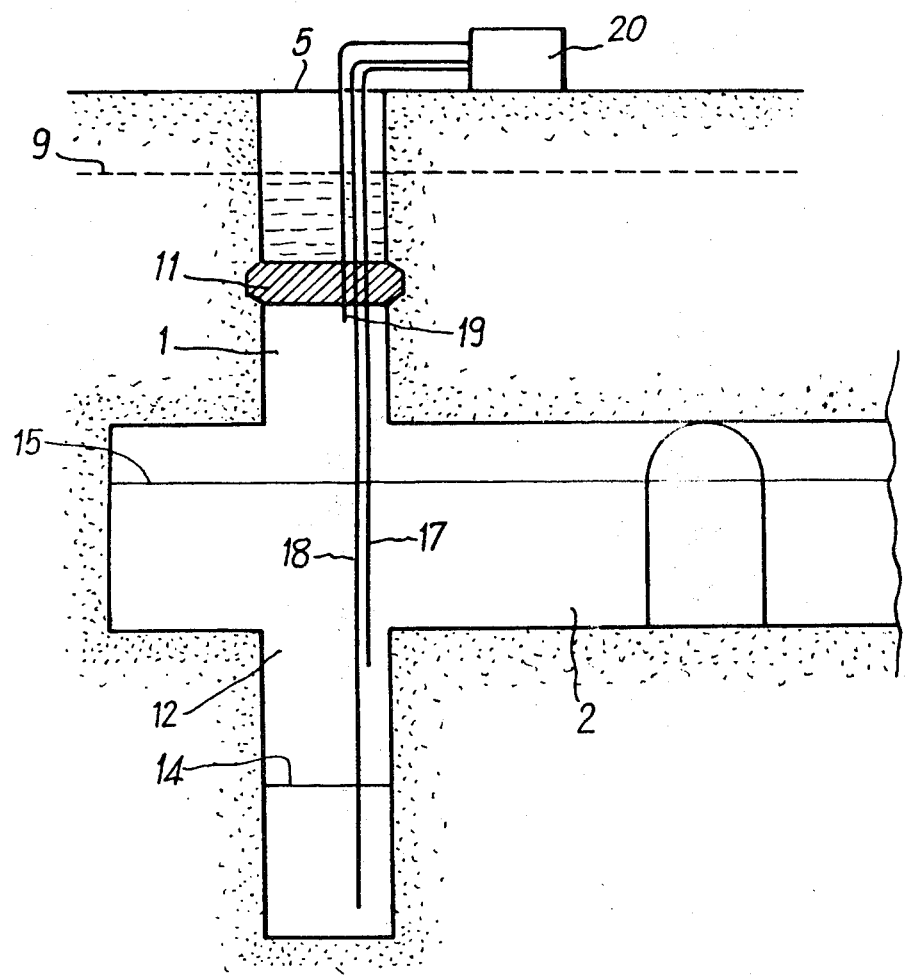
FIG. 1 is a schematic vertical sectional view taken through a conventional liquefied gas storage.
Figure 2:
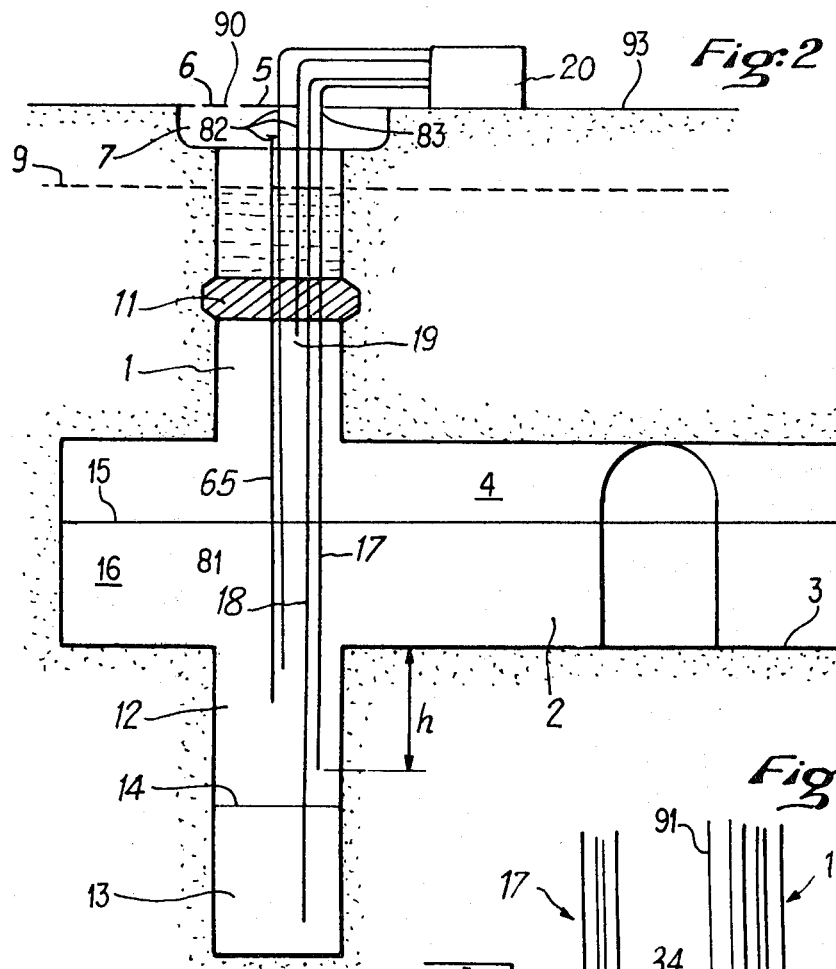
FIG. 2 is a view similar to FIG. 1 showing a storage according to the invention.

The storage according to the invention shown in FIG. 2 generally presents two noticeable differences with regard to the conventional storage of FIG. 1. In FIG. 2 there is provided an emergency room 7, with an inspection hole 90 closed by a heavy panel 6. Further, the lower suction end of propane extraction tube 17 is disposed lower, spaced by a distance h from the gallery floor. This distance h is such that the trap 12 volume between the lower end of tube 17 and the gallery floor represented by the product h.S (where S is the section area of the draining trap) is greater than the water volume in the tubes when the tubes are full of water in hydrostatic balance the volume of water in the tubes is represented by the product H.s (wherein H is the water level in the tubes, and s is the section area of the tubes). So the invention's condition is $$h.S > H.s$$

which will be discussed hereinafter.

Figure 3:
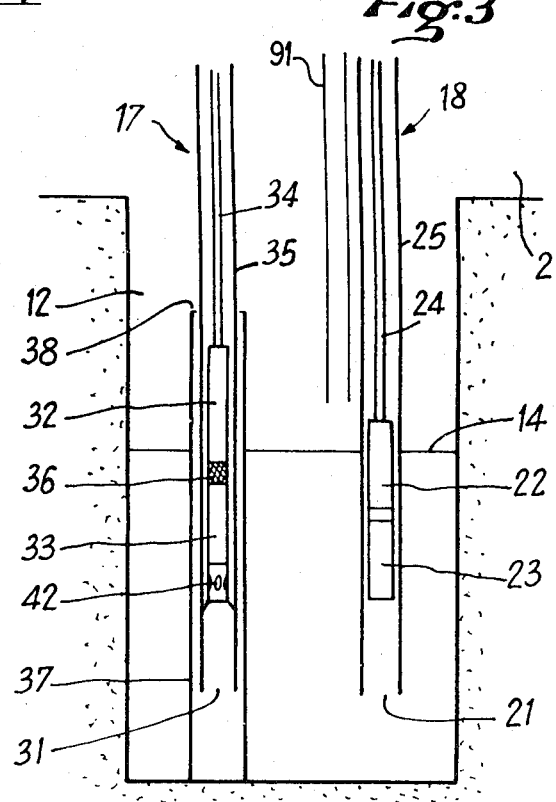
FIG. 3 is a schematic view showing the disposition of the water and propane pumps in the well draining trap.

The draining trap shown on FIG. 3 may be for example about 20 meters deep. For normal operating conditions, the interface 14 of water (bottom) and propane (top) should remain in the trap 12 between two determined limits. There is shown on the drawing one water extraction tube 18 and one liquid propane extraction tube 17. For safety grounds, or according to the type of product and the exploitation method, there may be provided two or three or more tubes for each product extracted. Other tubes such as the filling tube 81 to introduce propane into the cavity or tubes for the level, pressure, and temperature probes or for the alarms 91 may extend into the trap. The suction opening 21 of the water extraction tube is placed near the bottom of the trap, at about one or two meters from the bottom for example. A pump 22 driven by a motor 23 is disposed above the opening and discharges into tube 24, which also supports the motor and the pump, disposed inside sheath or casing 25. The casing further receives the necessary cables and accessories for supplying power and servo-mechanisms for the motor and the pump. The pump is vertically movable in casing 25.

Suction opening 31 of the propane extraction pump is also placed at a short distance from the trap bottom. Propane pump 32 driven by motor 33 draws up the propane through strainer 36, discharges it into tube 34 which also supports motor 33 and pump 32, and is disposed inside casing or sheath 35. The liquid propane pumping assembly is disposed within a suction pot 37. Pot 37 is closed at its lower end which rests on the trap bottom and extends upwardly around motor 33 and pump 32 up to a rim 38 of an upper opening spaced from the gallery floor by a distance h such as discussed above. In the same manner, pump 32, with motor 33, is movable vertically in casing 35 and is supported by tube 34.

In these conditions, the separation level 14 of liquid propane and water should be kept between upper rim 38 of suction pot 37 and water suction opening 21. As water constantly seeps towards the trap, level 14 rises. The water pump operation is then so controlled as to keep interface level 14 between opening 21 and pot rim 38. The level control may be provided by a known system such as a conventional level detecting apparatus which commands automatically the stop-start relay of the water pumps motors according to chosen predetermined values. Rim or upper suction opening 38 of the propane extraction pot is placed in the draining trap 12, under the level of gallery floor 2. If for any reason a water pump fails level 14 rises up above rim 38, the suction pot is then filled up with water. A signal is delivered by a suitable control apparatus and the propane pumps are thus stopped.

According to the invention, the "putting to sleep" of the installation stops the extraction operations while allowing safe introduction of propane to the storage. The water propane separation level is allowed to rise high enough above rim 38 to obtain a water volume above rim 38 in the trap greater than the water volume needed in the tubes for maintaining a hydrostatic balance with the storage pressure (see above discussed condition hs>Hs). As water is not permanantly desired on the gallery floor, it is a feature of the invention to have the distance h great enough to satisfy the above condition. It is also possible to introduce water in the tubes from the outside. In both cases, the water volume needed for "putting the installation to sleep" is important.

Valves 82 are disposed in safety room 7 on top of the different columns or tubes: filling 81, propane injection and pressure balance 19. The extraction tubes of the seeping water and of the propane extend outside above concrete slab 5, allowing the pumps to be pulled out. Each of the extraction tubes of propane may advantageously be fitted with a safety valve outside room 7 but it is important, according to a feature of the present invention, to provide the lower end of each tube on the suction side of the pump, with an emergency valve, so as to allow complete closure of the connection tube. The tubes for the gas pressure balance 19 or for the introduction of liquid propane 81 in the storage are fitted with valves disposed in safety room 7.

FIGS. 3 and 4 show an emergency valve disposed at the lower opening of tube 17. Sheath 35 is disposed inside pot 37. Electric motor 33 is disposed under pump 32, the motor and the pump being suspended by means of tube 34. Propane is sucked in the pump through strainer 36 (FIG. 3). According to the invention, there is provided under the motor an assembly including (1) a tubular portion 41 with ports 42, (2) an emergency or safety valve 44, the closing element of which is biased upwardly against the valve seat by suitable spring force, in the same direction as the pressure force when the valve is closed. Such a valve is conventional and usually designated as a "fail safe" type of valve. The opening of valve 44 is operated by means of a hydraulic fluid supplied by a flexible pipe 45 disposed inside sheath 35 outside discharge tube 34;

(3) a skirt 47, the outer surface of which is fitted with a packing gasket 48, ensures fluid tightness with lower extension 49 of sheath 35. This portion 49 is of a diameter slightly less than that of tube 35. It is so possible to raise the safety assembly and to pull it out for maintenance, repair or replacement, and to restore sealing at the end of the descent operation, when skirt 47 moves into extension 49.

When the device is in operation, pot 37 is filled with propane (or any other liquefied gas or hydrocarbon) which enters inside skirt 47, following the path as indicated by arrow 50, and passes through valve 44 when this valve is opened (position shown in broken lines) and through ports 42 then around motor 33 into strainer 36.

FIG. 5 shows a packing or sealing device for the head of a probe tube. Should a serious leak occur in another tube, such as a probe, it would be useless to take precautions for the pump tubes. According to the invention, there is provided a special packing device for the tubes protecting the different probes.

In the example shown, the probe is suspended from a suitable rope fixed in an eye 61 provided in a tab 62 fixed as per welding to a cover or closure 63 engaging an inner step 64 of probe tube 65. Tube 65 extends through concrete closure 11 (FIG. 2). Preferably, the under face of closure 63 is formed with a circular groove in which is disposed a gasket 66. Closure 63 is formed with a boring 67 tightly receiving probe cable 68. The diameter of boring 67 is designated so as to provide fluid imperviousness when cable 68 is in position.

So as the storage inner pressure cannot raise closure 63, the closure 63 is maintained on step 64 by means of a device described below. Closure 63 is united in a welding manner to an axial rod 71 engaging head 72 of a screw 73, screwed in a strut 74 engaging abutment 75, welded on the inner wall of tube 65. Strut 74 is easily installed since abutment 75 does not extend on the whole periphery of the inner wall of tube 65, but is interrupted along two sectors, each larger than strut 74. Screw 73 may be driven by means of a suitable spanner engaged on the square head 76 at the upper end of screw 73. A check-nut 77 may be provided for locking screw 73. The top of tube 65 may be closed by a cap 78, disposed in the safety room 7. A shackle 79 allows an operator to pull up closure 63 when strut 74 is disengaged. For extracting the probe, check-nut 77 is first loosened then square head 76 is turned in the suitable direction for loosening strut 74 from abutment 75. Thus strut 74 is pivoted 90° then extracted with screw 73. Afterwards, cover 63 is pulled out by any suitable mechanism passing in schackle 79 so the probe and the cable can be removed. The setting up is done by following the same operations in reverse.

The whole device is particularly simple, thus resistant to failures and accidents. The imperviousness is effective. For safety reasons, the lower end of each large tube extends into the draining trap so that in case of rupture or any other accident or malicious destruction, water rises and fills the tube up to reach a hydrostatic balance level. Thus, no propane can leak. This condition is realized for every large tube so that any eruption is impossible.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for underground storage of a liquefied gas in a storage chamber comprising:

water disposed within predetermined levels at a bottom portion of said storage apparatus;

liquefied gas disposed above said water level to a predetermined liquid level;

gas in a gaseous phase disposed above said liquid level of said liquefied gas;

at least one tube extending from ground level into said storage for controlling and working said storage from above;

said at least one tube comprising at least one extraction tube for extracting said liquefied gas from said storage;

means for generating an alarm signal in response to a change in said predetermined water levels;

means for filling said at least one extraction tube up to a hydrostatic balance level within said at least one extraction tube;

a trap for draining said water from said storage comprising a sunk draining trap in the form of a well disposed in a lower portion of said storage; and said at least one extraction tube having a suction opening formed therein and extending down into said trap along a distance such that the volume of said trap above said suction opening is sufficient for filling said at least one extraction tube up to said hydrostatic balance level.

2. An underground storage apparatus according to claim 1, further comprisng a pot, generally of a cylindrical form, closed at a bottom end portion and open at a top end portion, said at least one extraction tube extending therein so that said liquefied gas is extracted when said water level within said trap is below said open top.

3. An underground storage apparatus according to claim 1, further comprising:

a pump disposed within each said at least one extraction tube;

a motor and a suction skirt disposed at a lower end portion of each said at least one extraction tube and supported by said at least one extraction tube a protection sheath surrounding said at least one extraction tube, said motor and said pump wherein said sheath comprises said suction opening;

said suction opening further comprising sealing means for fluid imperviousness between a lower end portion of each said sheath and said suction skirt during a normal operating condition.

4. An underground storage apparatus according to claim 3, wherein said lower end portion of said sheath is a reduced diameter.

5. An underground storage apparatus according to claim 1, further comprising:

tubes for filling said storage;
tubes for effecting pressure balance of said gas;
tubes for probes for said storage;
tubes for control of said storage; and
safety valves of the normally closed type comprising a closing member disposed on a top portion of said filling, pressure balance, probe and control tubes.

6. An underground storage apparatus according to claim 5, further comprising a safety room disposed under said ground level on top of said storage such that access into said room is possible only with help of heavy machines, said safety valves disposed within said safety room.

7. An underground storage apparatus according to claim 3, wherein each said extraction tube sheath extends to said outside environment, each said sheath further comprising a safety valve disposed in said outside environment.

8. A underground storage according to claim 3 further comprising:

a normally closed safety valve disposed at a lower end of each said at least one extraction tube; and said safety valve further comprising a closing member.

9. An underground storage according to claim 6 further comprising a sealing device fitted to each said at least one tube for controlling and working said storage, said sealing device further comprising a latch disposed in said safety room.

10. An underground storage according to claim 1 further comprising:

a pressure balance tube having an opening in an upper portion of said storage, a pressure regulation valve connected to said pressure balance tube such that said regulation valve opens if pressure rises above a predetermined valve; and means for compressing gas discharged through said regulation valve and reintroducing said discharged gas into said storage.

11. A method for securing safety of an underground storage of hydrocarbon or liquefied product comprising:

channeling water to a bottom portion of said storage such that a layer of water is formed therein;

channeling liquefied product above and contiguous with said water;

enclosing a gaseous phase of said liquefied product within said storage, said gaseous phase disposed above and contiguous with said liquefied product;

introducing said liquefied product from a working level above said product, such as a ground level, by means of filling tubes extending from said working level into said liquefied product;

extracting said product from a working level above said product, such as a ground level, by means of at least one extraction tube extending from said working level into said product; and closing all said connection tubes when it is not possible to remedy in due time a failure of any working device or accidental or intentional breaking of an implement disposed at ground level.

12. A method according to claim 11 wherein the closure of each said extraction and filling tube extending into said liquid phase of said product is effected by filling said tubes with water up to a hydrostatic balance level.

13. A method according to claim 12 wherein an interface of liquefied product with water in a lower portion of said underground storage is raised up to a level above a lower opening of said tubes, sufficiently high for securing the filling of said tubes through discharging water there caused by a storage pressure.

14. A method according to claim 12 wherein said tubes are filled with water from upper end portions thereof.

* * * * *

UNITED STATES PATENT AND TRADEMARK OFFICE
CERTIFICATE OF CORRECTION

PATENT NO. : 4,417,829

DATED : November 29, 1983

INVENTOR(S) : Georges Berezoutzky

It is certified that error appears in the above-identified patent and that said Letters Patent is hereby corrected as shown below:

On the title page the assignee should read:

-- Societe Francaise de Stockage Geologique "GEOSTOCK", Paris, France --

Signed and Sealed this

Twelfth Day of June 1984

[SEAL]

*Attest:*

GERALD J. MOSSINGHOFF

*Attesting Officer*  *Commissioner of Patents and Trademarks*